(12) United States Patent
Sakamoto et al.

(10) Patent No.: US 10,949,078 B2
(45) Date of Patent: Mar. 16, 2021

(54) DISPLAY APPARATUS, DISPLAY METHOD, AND NON-TRANSITORY COMPUTER-READABLE RECORDING MEDIUM

(71) Applicant: Sharp Kabushiki Kaisha, Sakai (JP)

(72) Inventors: Kiho Sakamoto, Sakai (JP); Satoshi Terada, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 215 days.

(21) Appl. No.: 15/883,197

(22) Filed: Jan. 30, 2018

(65) Prior Publication Data

US 2019/0056846 A1  Feb. 21, 2019

(30) Foreign Application Priority Data

Jan. 31, 2017 (JP) .............................. JP2017-015661

(51) Int. Cl.
| | | |
|---|---|---|
| *G06F 3/0488* | (2013.01) | |
| *G06F 3/041* | (2006.01) | |
| *G06F 3/0482* | (2013.01) | |
| *G06F 3/0354* | (2013.01) | |

(52) U.S. Cl.
CPC .......... *G06F 3/0488* (2013.01); *G06F 3/0416* (2013.01); *G06F 3/0482* (2013.01); *G06F 3/04883* (2013.01); *G06F 3/03545* (2013.01)

(58) Field of Classification Search
CPC .. G06F 3/0488; G06F 3/04883; G06F 3/0416; G06F 3/0482
See application file for complete search history.

(56) References Cited

U.S. PATENT DOCUMENTS

| | | | | |
|---|---|---|---|---|
| 5,404,458 A | * | 4/1995 | Zetts | G06F 3/04883 710/73 |
| 5,539,429 A | * | 7/1996 | Yano | B60R 16/0231 340/990 |
| 5,943,043 A | * | 8/1999 | Furuhata | G06F 3/045 345/173 |
| 6,856,259 B1 | * | 2/2005 | Sharp | G06F 3/0488 178/18.01 |
| 7,489,307 B2 | | 2/2009 | Tanaka et al. | |
| 7,948,476 B2 | * | 5/2011 | Goto | G06F 3/0488 345/173 |
| 9,910,524 B1 | * | 3/2018 | Wells | G06F 1/1684 |
| 2006/0256091 A1 | * | 11/2006 | Hino | G06F 3/0482 345/173 |
| 2006/0274944 A1 | * | 12/2006 | Tanaka | G06K 9/222 382/186 |

(Continued)

FOREIGN PATENT DOCUMENTS

| | | |
|---|---|---|
| CN | 103513871 A | 1/2014 |
| JP | 2003-195996 A | 7/2003 |

(Continued)

*Primary Examiner* — Phenuel S Salomon

(74) *Attorney, Agent, or Firm* — Keating & Bennett, LLP

(57) ABSTRACT

An apparatus for display content on a touch panel includes a detecting unit that detects a touchdown to touch the touch panel and a touchup to lift off from the touch panel to cancel touching, and a menu display control unit that performs control to display menu if the touchup is detected after the touchdown is detected within a display region of the content.

11 Claims, 14 Drawing Sheets

(56) References Cited

U.S. PATENT DOCUMENTS

| | | | |
|---|---|---|---|
| 2007/0180392 A1* | 8/2007 | Russo | G06F 3/0482 715/765 |
| 2007/0180405 A1* | 8/2007 | Takakuwa | G11B 19/025 715/828 |
| 2008/0024459 A1* | 1/2008 | Poupyrev | G06F 3/016 345/173 |
| 2008/0186285 A1 | 8/2008 | Shimizu | |
| 2009/0322686 A1* | 12/2009 | Jayasinghe | G06F 3/04886 345/173 |
| 2011/0169756 A1* | 7/2011 | Ogawa | G06F 3/044 345/173 |
| 2011/0181780 A1* | 7/2011 | Barton | H04N 21/4126 348/563 |
| 2012/0133658 A1* | 5/2012 | Mori | G06T 13/80 345/473 |
| 2013/0002714 A1* | 1/2013 | Saito | G06F 3/04886 345/629 |
| 2014/0325402 A1* | 10/2014 | Jung | G06F 3/04883 715/763 |
| 2015/0002424 A1* | 1/2015 | Yamamoto | G06F 3/04883 345/173 |
| 2015/0058804 A1* | 2/2015 | Kim | G06F 3/0482 715/810 |
| 2015/0123915 A1* | 5/2015 | Iwaizumi | G06F 3/0488 345/173 |
| 2015/0169519 A1* | 6/2015 | Zhou | G06F 40/166 715/256 |
| 2015/0199036 A1* | 7/2015 | Akitomo | G06F 3/038 345/173 |
| 2016/0139800 A1* | 5/2016 | Hatanaka | G06F 3/041 715/784 |
| 2017/0097764 A1* | 4/2017 | Takahashi | G06F 3/04845 |
| 2017/0293387 A1* | 10/2017 | Zhang | G06F 3/016 |

FOREIGN PATENT DOCUMENTS

| | | |
|---|---|---|
| JP | 2006-343856 A | 12/2006 |
| JP | 2008-191799 A | 8/2008 |
| JP | 2015-052982 A | 3/2015 |

* cited by examiner

FIG. 1
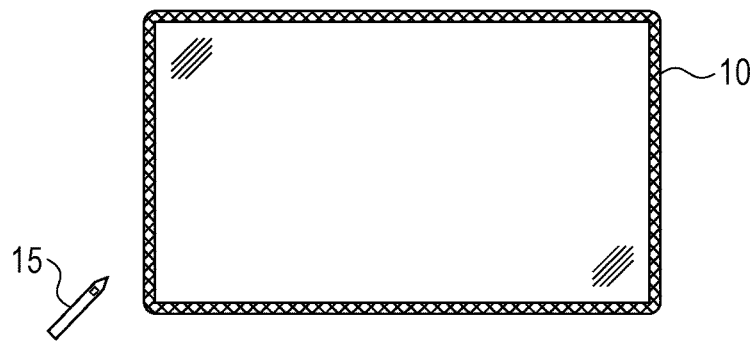
FIG. 2
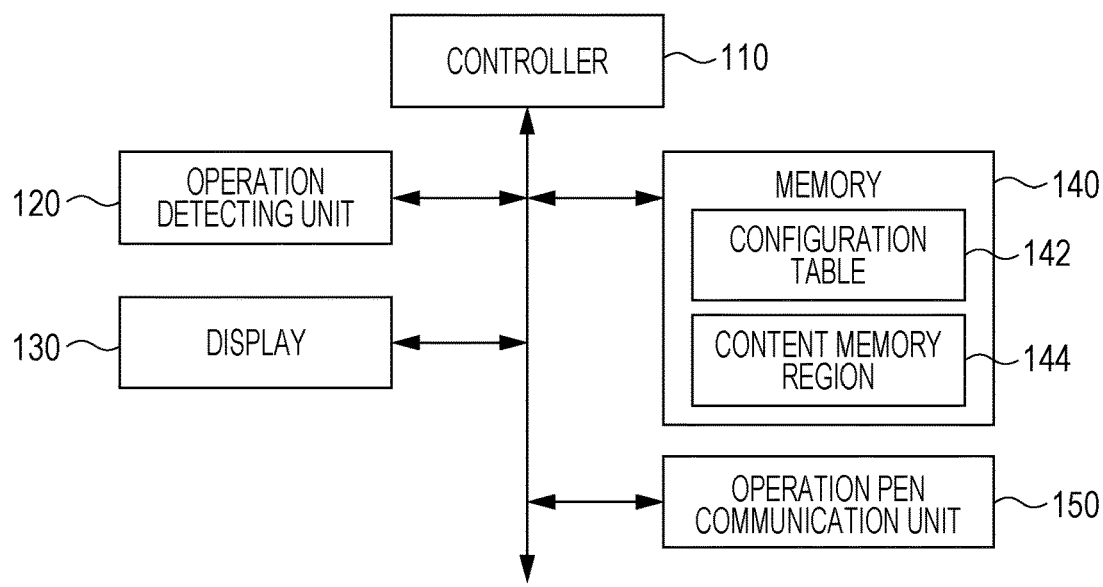
FIG. 3
| ITEM | VALUE |
|---|---|
| DISPLAY WAITING TIME | 1 SECOND |
| NON-DISPLAY WAITING TIME | 5 SECONDS |

FIG. 14

| CONTENT | ITEM | VALUE |
|---|---|---|
| STILL IMAGE CONTENT | DISPLAY WAITING TIME | 1 SECOND |
| | NON-DISPLAY WAITING TIME | 5 SECONDS |
| MOVING IMAGE CONTENT | DISPLAY WAITING TIME | 0 SECONDS |
| | NON-DISPLAY WAITING TIME | 10 SECONDS |

DISPLAY APPARATUS, DISPLAY METHOD, AND NON-TRANSITORY COMPUTER-READABLE RECORDING MEDIUM

BACKGROUND

1. Field

The present disclosure relates to a display apparatus, a display method, and a non-transitory computer-readable recording medium.

2. Description of the Related Art

Display apparatuses are disclosed that perform control to display one or more pieces of content, such as a document file and an image file. Also disclosed is a display apparatus that allows a person to perform a hand-written drawing on the content with an operation pen. Such a display apparatus finds application as an electronic whiteboard.

A menu is typically displayed for users to perform a variety of operations on the content. When the menu is displayed, the menu may be separately displayed from the content or may be displayed on the content in an overlay fashion.

The content positioned beneath the menu is difficult to view if the menu occludes the content. Japanese Unexamined Patent Application Publication No. 2006-343856 disclosed a technique that displays the content positioned beneath or performs a rendering operation by displaying the menu in a see-through way.

When a user performs a rendering operation on the content, the menu does not necessarily have to be displayed. In practice, however, the rendering operation is performed with the menu displayed. In the related art, the timing of the menu displaying is when the content selection is made. Even if the menu is not frequently used, the menu is still displayed. This may inconvenience users.

According to Japanese Unexamined Patent Application Publication No. 2006-343856, the menu is simply displayed in a see-through way. Electronic whiteboard or electronic table, presenting content, is disclosed. Such a system is intended to display content rather than a menu of less value.

SUMMARY

It is desirable to provide a user friendly apparatus which controls a display mode of menu appropriately in response to a user's operation.

According to one aspect of the disclosure, there is provided an apparatus for displaying content on a touch panel. The apparatus includes a detecting unit that detects a touchdown to touch the touch panel and a touchup to lift off from the touch panel to cancel touching, and a menu display control unit that performs control to display a menu if the touchup is detected after the touchdown is detected within a display region of the content.

According to another aspect of the disclosure, there is provided a method for displaying content on a touch panel. The method includes detecting a touchdown to touch the touch panel and a touchup to lift off from the touch panel to cancel touching, and performing control to display a menu if the touchup is detected after the touchdown is detected within a display region of the content.

BRIEF DESCRIPTION OF THE DRAWINGS

FIG. 1 is an external view of a display apparatus of the disclosure;

FIG. 2 illustrates a functional configuration of a first embodiment;

FIG. 3 illustrates an example of a data structure of a configuration table of the first embodiment;

FIG. 14 illustrates an example of a data structure of a configuration table of an eighth embodiment;

DESCRIPTION OF THE EMBODIMENTS

Figure 4:
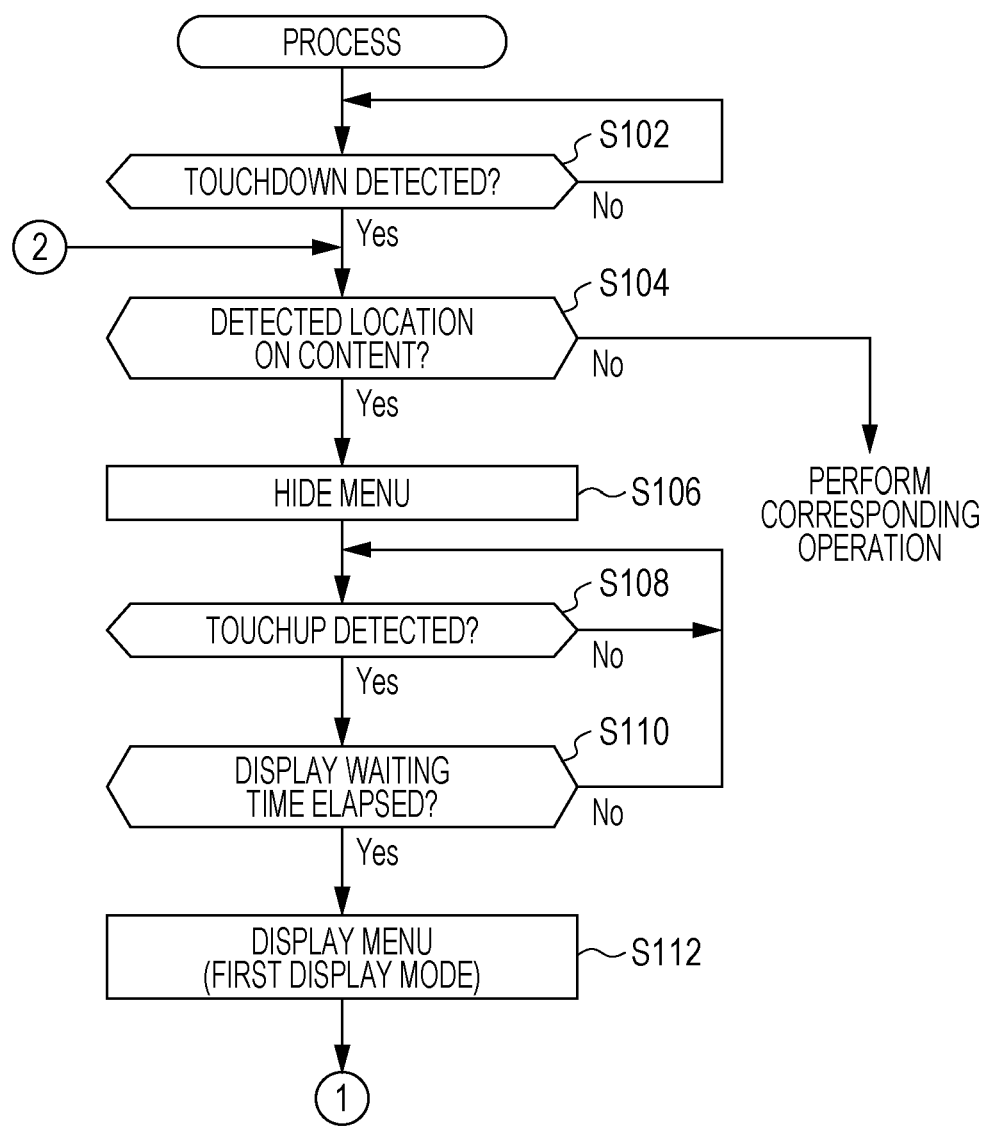
FIG. 4 is a flowchart illustrating a process of the first embodiment.

Embodiments of the disclosure are described below with reference to the drawings. For convenience of explanation, a display apparatus with a touch panel combined in a unitary body is described in the embodiments. As long as a display apparatus causes an object to be rendered or drawn thereon, the embodiments are applicable to any display apparatus.

1. First Embodiment

A first embodiment is described below. In the first embodiment, a menu is displayed when a user touches a touch panel. After a time elapse of a specific period of time, a display mode of the menu changes.

The first embodiment relates to a method of changing the display mode. After a time elapse of a non-display waiting time as the specific time period from the displaying of the menu, the menu is hidden.

1.1 General Configuration

FIG. 1 is an external view of a display apparatus 10 as a display apparatus of the disclosure. The display apparatus 10 may be a liquid-crystal display, for example, and includes a touch panel that receives a touch input.

The touch panel receives operations performed by a user, such as a touch, a flick, or a slide. A detection mechanism of detecting a touch may be a capacitance touch panel or a pressure sensitive touch panel. Any type of device may be acceptable as long as the device appropriately receives a user's operation.

The touch operation may be performed using a user's finger or an operation pen 15. The operation pen 15 may be a touch pen, a stylus pen, a pen simply manufactured of resin, or an electronic pen with the motion thereof being detectable.

A user of the operation pen 15 may be identified using information uniquely identifying the operation pen 15 (such as a serial number or a media access control (MAC) address).

Any of a variety of apparatuses may be contemplated as the display apparatus 10. If the display apparatus 10 is a large and stationary one, an electronic white board may be contemplated as the display apparatus 10. If the display apparatus 10 is a small and portable one, a terminal device, such as a tablet, is contemplated as the display apparatus 10. A smart phone may also be contemplated as the display apparatus 10. The display apparatus 10 may also be one of a variety of displays and information processing apparatuses, including a computer, a car navigation system, and an electronic dictionary.

1.2 Functional Configuration

The functional configuration of the display apparatus 10 of the first embodiment is described with reference to FIG. 2. Referring to FIG. 2, the display apparatus 10 includes a controller 110, an operation detecting unit 120, a display 130, a memory 140, and an operation pen communication unit 150.

The controller 110 is a function module that generally controls the display apparatus 10. The controller 110 includes a central processing unit (CPU), for example, and implements a variety of functionalities by reading and executing various programs from the memory 140.

If the controller 110 includes a touch panel, the controller 110 displays an object, such as an image input and rendered via a display screen (the operation detecting unit 120), and controls the displaying of an image input via another image input device.

The operation detecting unit 120 is a function unit that detects an operation performed by a user. For example, the operation detecting unit 120 may be a touch panel that is integrated with the display 130 into a unitary body. The operation detection mechanism may use any type of mechanism. For example, the operation detection mechanisms may include a capacitance type, a pressure-sensitive type using a resistance film, an infrared type, and an electromagnetic induction type.

The operation detecting unit 120 may detect a touchdown and a touchup. For example, the operation detecting unit 120 may detect the touchdown when the user touches a touch panel (when an object touches the touch panel or an operation on the touch panel is detected), and the touchup when the user lifts an object off the touch panel (when the contact state of the object with the touch panel is canceled or when the operation on the touch panel becomes undetected).

The display 130 displays a variety of information to the user and a sheet on which an object is rendered or drawn. For example, the display 130 includes a liquid-crystal display (LCD) and an organic electro-luminescent display.

The memory 140 stores a variety of program and data used by the display apparatus 10 in operation. The memory 140 may be a semiconductor memory, such as a solid state drive (SSD), or a magnetic disk, such as a hard disk drive (HDD).

The memory 140 stores a configuration table 142 that stores a variety of configuration values, and holds a content memory region 144 to store content.

FIG. 3 illustrates an example of the data structure of the configuration table 142. For example, the configuration table 142 stores, as the configuration values, a display waiting time ("1 second", for example), and a non-display waiting time ("5 seconds", for example). The display waiting time is a first waiting time that extends until a menu is displayed first (first menu), and the non-display waiting time is a second waiting time that extends until the display mode is changed to display a second menu instead of the first menu.

As described with reference to the first embodiment, the second menu may be either in a hidden state or may be displayed in a smaller size. When the second menu is displayed on the content n the smaller size display state, the character height of the second menu is set be shorter, only part of the second menu is displayed, or the second menu is displayed in icons (the icons include pictures, characters, drawings, and symbols).

The values stored on the configuration table 142 may be pre-stored values, set in a service mode by a service engineer, or set to be any value by the user. The values stored on the configuration table 142 may be replaced with values calculated with a program. In accordance with the first embodiment, the configuration table 142 is stored on the memory 140. The values may be stored as arguments in a program to be executed, may be stored on an external storage device, or may be stored on a server so that the values are read each time they are to be used.

The content memory region 144 stores content to be displayed on the display 130. The content may be produced by the user, or may be read from an external storage device, or may be received from an external device.

The content contains a static image file (a joint photographic experts group (JPEG) file, a graphic interchange format (GIF) file, or a portable network graphics (PNG) file), and/or a document file (such as a text file, a word-processor file, a spreadsheet file, a presentation file, or a portable document format (PDF) file), and/or a moving image file (an audio video interleave (AVI) file, or an moving image experts group (MPEG) file).

The operation pen communication unit 150 communicates with the operation pen 15. A variety of communication methods may be contemplated to communicate with the operation pen 15. More specifically, a variety of operations may be detected via an electro-magnetic induction mechanism, or radio communications, or using other operation detection mechanisms.

The contents stored on the memory 140 are contents to be stored on the display apparatus 10. The contents may be stored on an external storage device, or on a cloud server. The program may be stored on a server, and the server may then execute the program.

1.3 Procedure of Process

Figure 5:
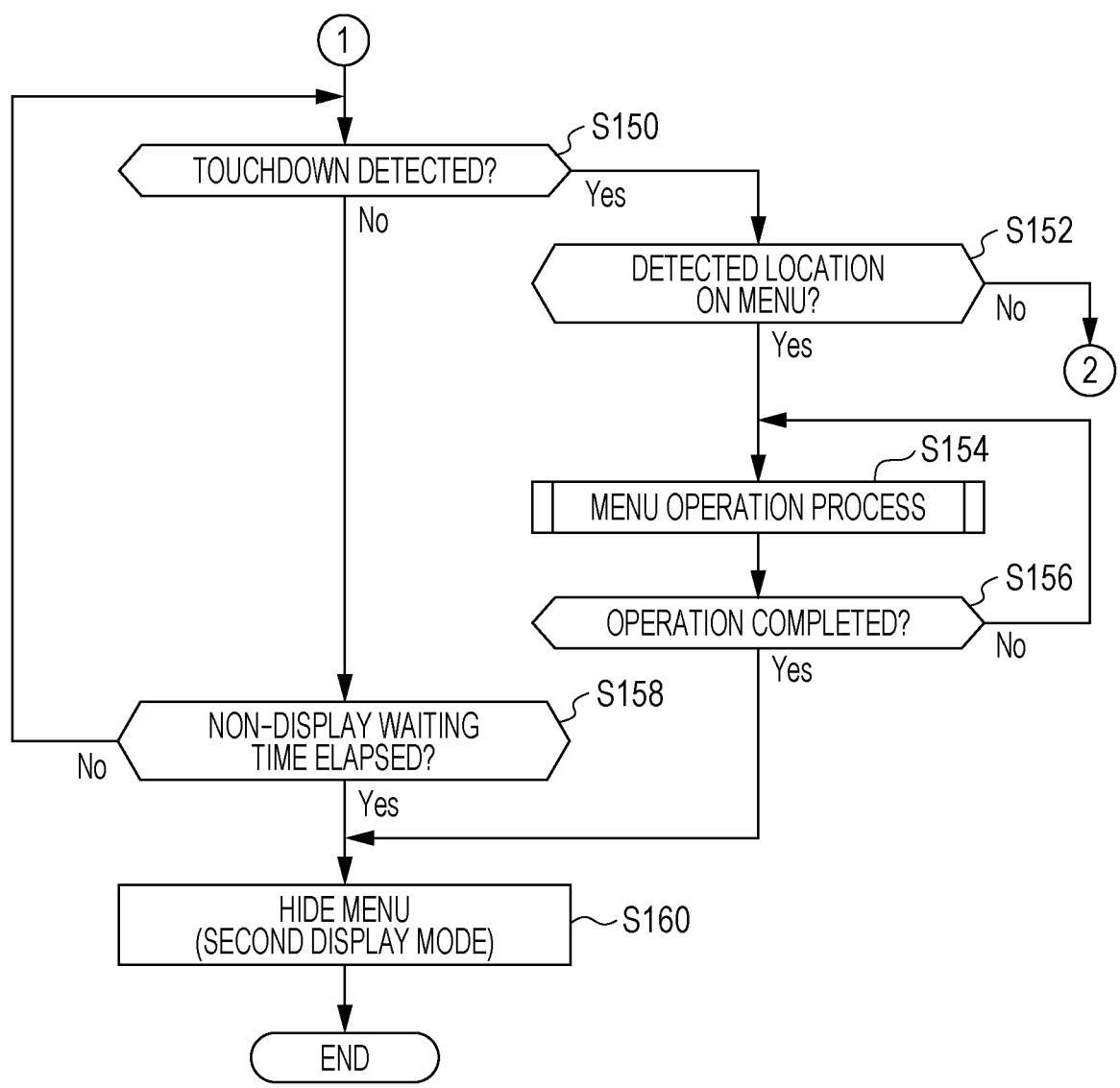
FIG. 5 is a flowchart illustrating a process of the first embodiment.

The procedure of the process of the first embodiment is described with reference to FIG. 4 through FIG. 6. FIG. 4 through FIG. 5 illustrate the process of the first embodiment. FIG. 6 illustrates a display example of the content to be displayed on a display.

In accordance with the first embodiment, the process is performed to display the content on a display screen when a user inputs an operation. More specifically, when the operation detecting unit 120 detects a touchdown performed by the user (yes branch from step S102), the following process is performed.

The detection of the touchdown may be performed by detecting an event that is triggered when the user touches the touch panel. For example, the touchdown may be detected when a touchdown event occurs or a touch state starts. The event is triggered by using the operation pen 15 or a finger (or a hand) of the user.

If a location (coordinates on a display screen) of a detected touchdown is on the displayed content, the process starting with step S106 is performed (yes branch from step S104). If the location is not on the content, a corresponding operation (such as a menu operation including volume adjustment and new content production). The discussion of such operation is omitted herein.

If the touchdown is detected on the content, the menu overlaying the content is hidden (step S106). If the menu is not displayed on the current content, this operation is not performed.

Figure 6A:
FIG. 6A through FIG. 6D illustrate an operation of the first embodiment (to display content)

The relationship between the content and menu is described with reference to FIG. 6A through FIG. 6D. FIG. 6A illustrates a menu M100 overlaid on content W100. In the first embodiment, the menu M100 is displayed above the content W100 (with an operation menu in a menu display region). Alternatively, the menu M100 may be displayed above the content W100 or to the right or left of the content W100. The width of the menu M100 is the same width as the content W100, but the menu M100 and the content W100 may be different in width.

The menu M100 may be displayed on the content W100 in a see-through fashion. For example, if the menu M100 is displayed with a transmittance of 50%, the user may partially view the content beneath the menu M100.

The menu M100 includes a variety operation buttons (regions). For example, FIG. 6A illustrates a menu button B102, a rendering button B104, a thumbtack button B106, a content size modifying button B108.

When the user touches the menu M100, the operation is intended to be performed on the menu M100. For example, the size and color of a hand-writing pen may be modified by touching the rendering button B104.

A variety of functionalities may be assigned to each button, and the operation thereof is omitted in the discussion of the first embodiment.

Figure 6B:
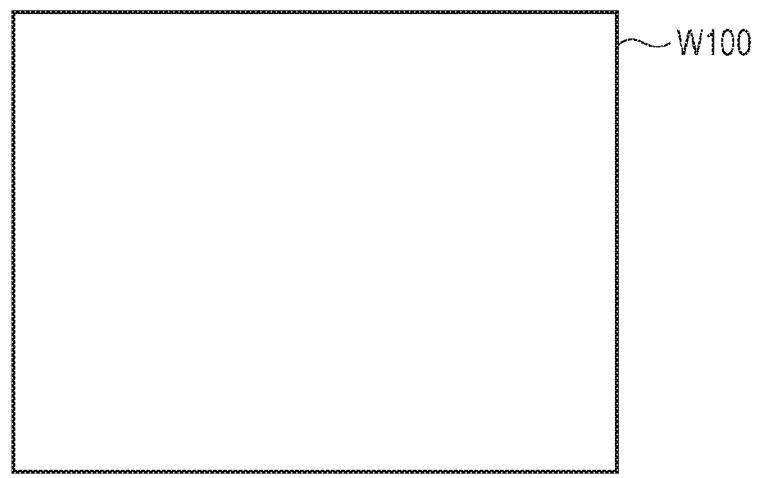

FIG. 6B illustrates the content W100 with the menu hidden. In this way, the menu M100 is switched between being displayed and being hidden.

Turning back to FIG. 4, the process is described. Since the touchdown is detected in step S102, the touch panel is in a touch state (with a finger or the operation pen 15 in touch with the touch panel). In the touch state, a variety of operations may be performed. For example, rendering with the operation pen 15, image processing including size expansion and reduction, or rotation of the content, and image movement are performed.

The operation detecting unit 120 detects a touchup (step S108). The touchup is intended to mean that a finger or the operation pen 15 lifts off the touch panel (not in touch with the touch panel). The touchup is thus intended to mean that the touch state is undetected.

The controller 110 determines whether the display waiting time has elapsed since the detection of the touchup (step S110). In accordance with the first embodiment, the display waiting time is "1 second". The operations in step S108 and S110 are iterated for 1 second. In other words, the display apparatus 10 remains in the waiting state.

When the display waiting time has elapsed (yes branch from step S110), a standard menu as the first display mode is displayed (step S112). The menu is thus displayed on the content within a menu display region that is reserved on the content. The standard menu display is intended to mean that an operation button or icon is displayed in an appropriate size in a user friendly way, or that each functionality is indicated by text.

The controller 110 determines whether a touchdown is detected (step S150 of FIG. 5). If no touchdown is detected (no branch from step S150), the controller 110 determines whether the non-display waiting time has elapsed (step S158). The operations in step S150 and S158 are iterated until the non-display waiting time has elapsed (control proceeds from no branch in step S158 to step S150). When the non-display waiting time has elapsed, the display apparatus 10 shifts to the second display mode with the menu hidden (control proceeds from yes branch in step S158 to step S160).

The non-display waiting time of the first embodiment is "5 seconds" as illustrated in FIG. 3. The menu is hidden again at the time elapse of 5 seconds from the displaying of the menu.

When the user lifts his or her finger or the operation pen 15 off the touch panel and a touchup is detected, the menu is displayed. When the menu has been displayed for 5 seconds, the display apparatus 10 shifts to the second display mode with the menu hidden. The non-display waiting time may start at the detection of the touchup. In such a case, the menu is displayed after a time elapse of 1 second from the touchup and the menu is hidden after the time elapse of 4 seconds from the touchup.

When the menu is hidden in the second display mode, visual effects including a fadeout operation or a slideout operation may be used.

If a touchdown is detected again with the menu displayed (yes branch from step S150), the controller 110 determines whether the location of the touchdown (where the user touches the touch panel) is on the menu. More specifically, the controller 110 determines whether the detected location in touchdown coordinates is within a menu region.

If the touchdown location is on the menu, the controller 110 performs the menu operation in response to the touch location (control proceeds from yes branch in step S152 to step S154). The controller 110 performs an operation responsive to each operation button displayed on the menu. Each operation is not described herein.

After the completion of the operation, the menu is switched to a hidden state (control proceeds from yes branch in step S156 to step S160). Alternatively, after the completion of the operation, control may proceed to step S158, and the menu may be hidden after the elapse of the non-display waiting time.

If the detected location is not on the menu in step S152, the controller 110 performs the process again, starting with the operation in step S104 of FIG. 4 (control proceeds from no branch in step S152 to step S104).

Figure 7:
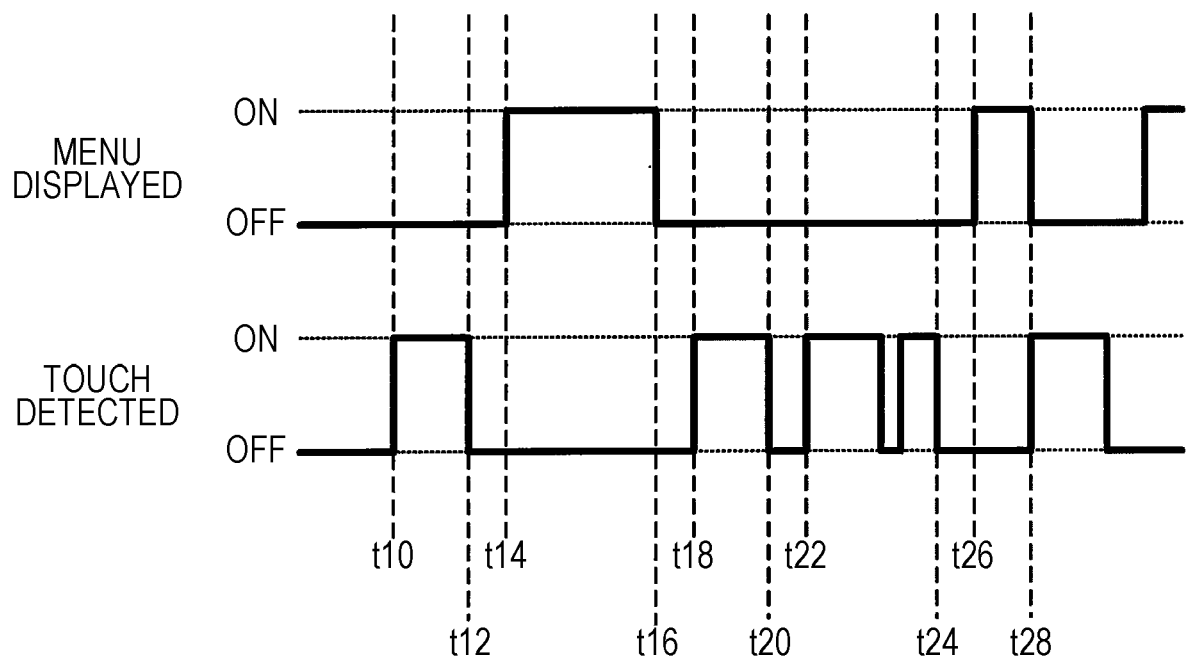
FIG. 7 illustrates an operation timing of the first embodiment.

The relationship between the touch detection and the menu displaying is described with reference to a flowchart of FIG. 7. If nothing is in contact with the touch panel, the standard menu is not displayed (down to time t10). If a touchdown is detected, namely, the touch detection is "on", the menu displaying remains "off".

If a touch is detected, namely, the touch detection turns "off" (time t12), the menu is displayed at time t14 after the elapse of the display waiting time (the menu displaying "on").

At time t16 after the elapse of the non-display waiting time, the menu is hidden (the menu displaying "off").

At time t18, the touch detection is "on", and at time t20, the touch detection is "off". Since the touch detection turns "on" at time t22 prior to the elapse of the display waiting time, the menu displaying remains "off".

If a time interval between the touch detection "on" (touchdown) and the touch detection "off" (touchup) is shorter, the menu does not turn "on" each time. This arrangement controls the inconvenience that the user has difficulty viewing the touch panel because the menu is more frequently switched between a displayed state and a hidden state.

At time t24, the touch detection turns "off", and the menu is displayed at time t26 after the elapse of the display waiting time (the menu displaying "on"). The menu is originally intended to be displayed during the non-display waiting time, but since the touch detection turns "on" at time t28 in the middle, the menu is hidden (the menu displaying "off").

In accordance with the first embodiment, the menu display mode is automatically switched as appropriate. In other words, the display apparatus 10 automatically alternates between the displayed state and the hidden state. Since the menu is displayed after the elapse of the display waiting time, inconvenience that the menu is hidden in the middle of an operation is thus controlled. In accordance with the first embodiment, flickering caused by the frequent switching between the displayed state and the hidden state is also controlled.

If the menu displaying is performed with a higher priority, the display waiting time may be set to be "0 seconds" for example. The menu is thus displayed at the touchup.

Figure 6C:
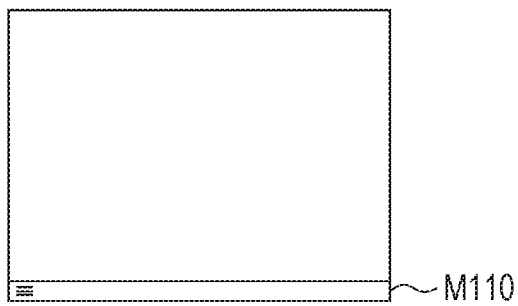
Figure 6D:
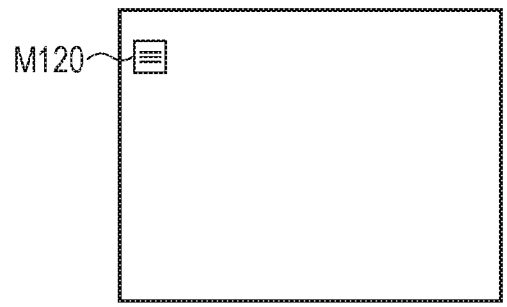

In the discussion of the first embodiment, the second menu display mode is the hidden mode. For example, the menu may be switched to a brief menu M110 having a size smaller than (lower in height than) the first display mode as illustrated in FIG. 6C, or may be switched to an icon menu M120 as illustrated in FIG. 6D.

2. Second Embodiment

A second embodiment is described below. In the second embodiment, the controller 110 determines whether an object having touched the touch panel is the operation pen 15 or another object (such as a finger), and then modifies the menu displaying timing accordingly. The second embodiment remains unchanged in functional configuration from the first embodiment, and the following discussion focuses on a difference therebetween.

Figure 8:
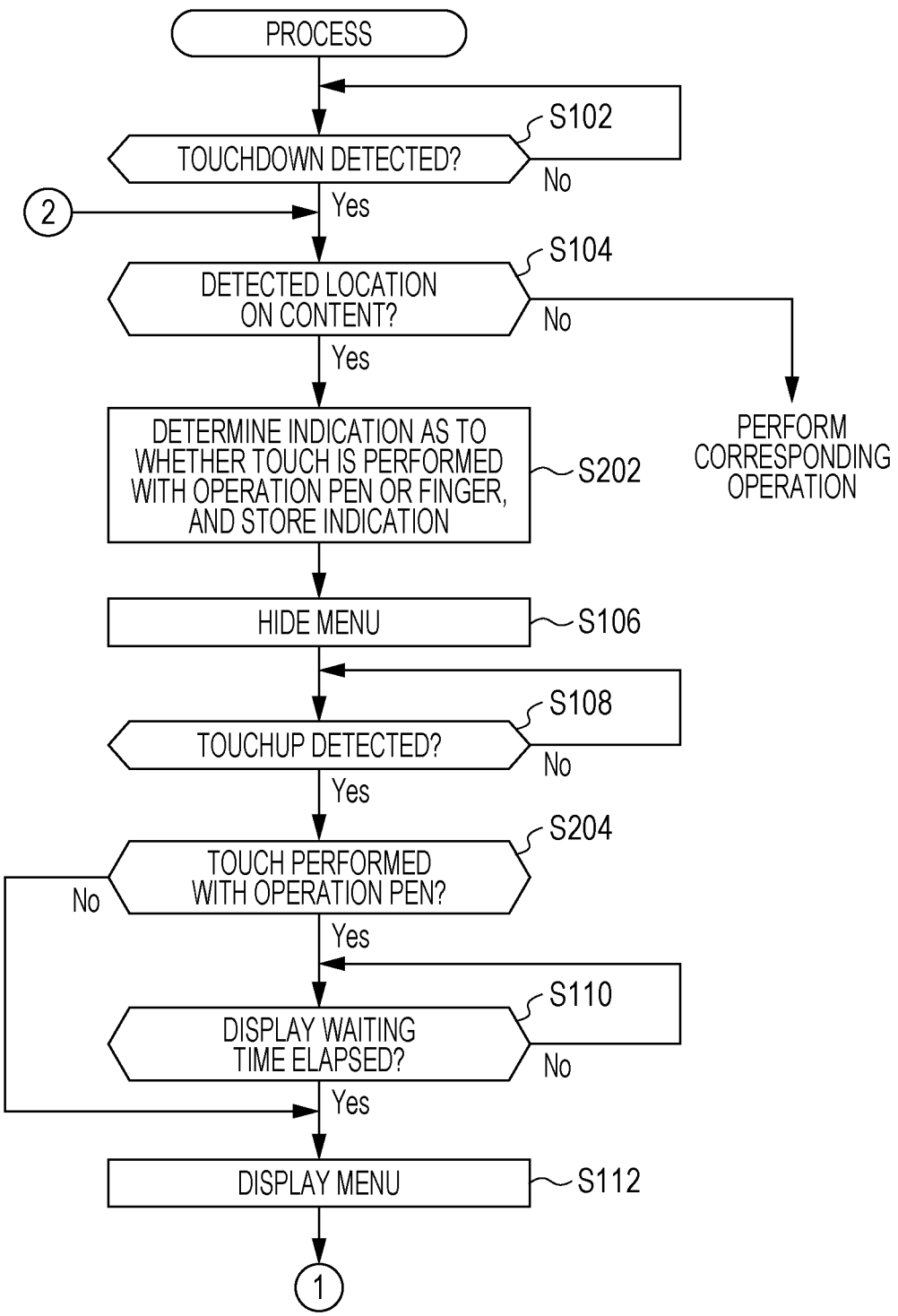
FIG. 8 is a flowchart illustrating a process of a second embodiment.

In accordance with the second embodiment, the process of FIG. 4 is replaced with the process of FIG. 8. Operations identical to those of the first embodiment are designated with the same reference numerals, and the discussion thereof is omitted herein.

After a touchdown is detected (yes branch from step S102), the controller 110 determines whether the object having touched the touch panel is the operation pen 15 or any other object (such as a finger), and stores the results on the memory 140 (step S202). For example, if the touch panel is communicable with the object in contact with the touch panel, the controller 110 determines that the object is the operation pen 15. If the object is other than the operation pen 15, the controller 110 determines that the object is a finger.

If the object in contact with the touch panel is the operation pen 15 when a touchup is detected (yes branch from step S108), the menu is displayed after the elapse of the display waiting time in a way similar to the first embodiment (control process from yes branch in step S204 to yes branch from step S110 to step S112).

If the object in contact with the touch panel is a finger, for example, other than the operation pen 15, the menu is displayed at the timing of a touchup (control proceeds from no branch in step S204 to step S112).

In accordance with the second embodiment, the timing of displaying the menu is changed depending on the object placed in contact with the touch panel. For example, if the object is the operation pen 15, the rendering operation typically consecutively repeated, and the second embodiment is effective not to switch the menu frequently.

A determination as to whether the object in contact with the touch panel is the operation pen 15 may be performed at another timing. For example, this determination may be performed each time the touchdown has been detected, or each time the touchup has been detected.

The storage medium storing an indication as to whether the touch operation has been performed by the operation pen 15 or a finger may be a temporary storage. Operations in steps S108 and S204 may be consecutively performed. More specifically, if the object in contact with the touch panel is the operation pen 15 when a touchup is detected, the menu is displayed after the elapse of the display waiting time. Otherwise, the menu may be displayed immediately.

Since the display waiting time is changed depending on whether the object is the operation pen 15 or not, the menu may be displayed after the elapse of the second display waiting time.

3. Third Embodiment

A third embodiment is described below. In the third embodiment, the controller 110 switches between the displayed state and the hidden state by determining the thumbtacked state. The third embodiment is identical in functional configuration to the first embodiment, and the following discussion focuses on a difference therebetween.

Figure 9:
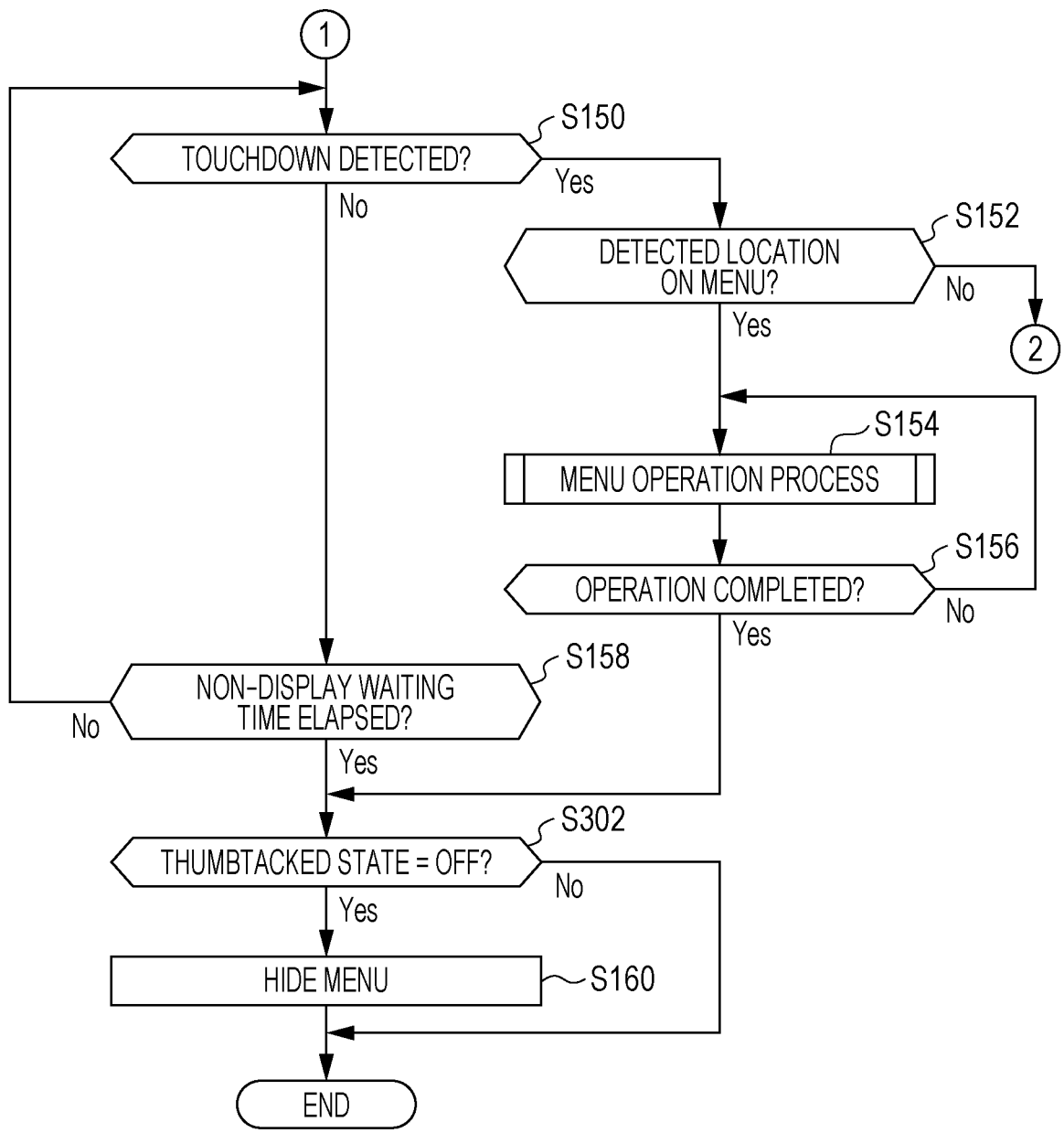
FIG. 9 is a flowchart illustrating a process of a third embodiment.

In accordance with the third embodiment, the process of the first embodiment of FIG. 5 is replaced with the process of FIG. 9. Operations identical to those of the first embodiment are designated with the same reference numerals and the discussion thereof is omitted herein.

The user may switch on or off the thumbtacked state using the thumbtack button B106 in the menu of FIG. 6A.

If the thumbtacked state is "off", the menu is hidden after the non-display waiting time (control proceeds from yes branch in step S158 to yes branch in step S302 to step S160). If the thumbtacked state is "on", the menu remains displayed (no branch from step S302).

In accordance with the third embodiment, the user may configure the menu to remain displayed even after the elapse of the non-display waiting time. The menu may be continuously displayed with the thumbtacked state "on" by performing the same determination prior to step S106 of FIG. 4.

The thumbtacked state in the third embodiment refers to a functionality to continue to display the menu or a functionality associated with another functionality. For example, if the thumbtacked state is on, content may remain stationary or fixed in size. If an expansion or reduction operation (such as a pinch-in operation or pinch-out operation) is performed on the content with the content remaining fixed in size, only a content portion within the content may be expanded or reduced (with the menu remaining fixed in size).

The menu may be continuously displayed to display which mode is selected for the content or a portion of the content. In another example, the menu may be continuously displayed if an item to continuously use a state on the menu (such as the color or type of a pen) is selected as an attribute that is used to determine an operation subsequent to the detection of a touch on the sheet. For example, if the rendering button B104 selects a pen or an eraser, the menu is continuously displayed to recognize which rendering mode to select (to write, erase, or use what color in writing).

4. Fourth Embodiment

A fourth embodiment is described below. In the fourth embodiment, an average time interval between touches of the user is calculated, and the non-display waiting time is automatically adjusted. In the fourth embodiment, the functional configuration remains unchanged from the first embodiment, and the following discussion focuses on a difference therebetween.

Figure 10:
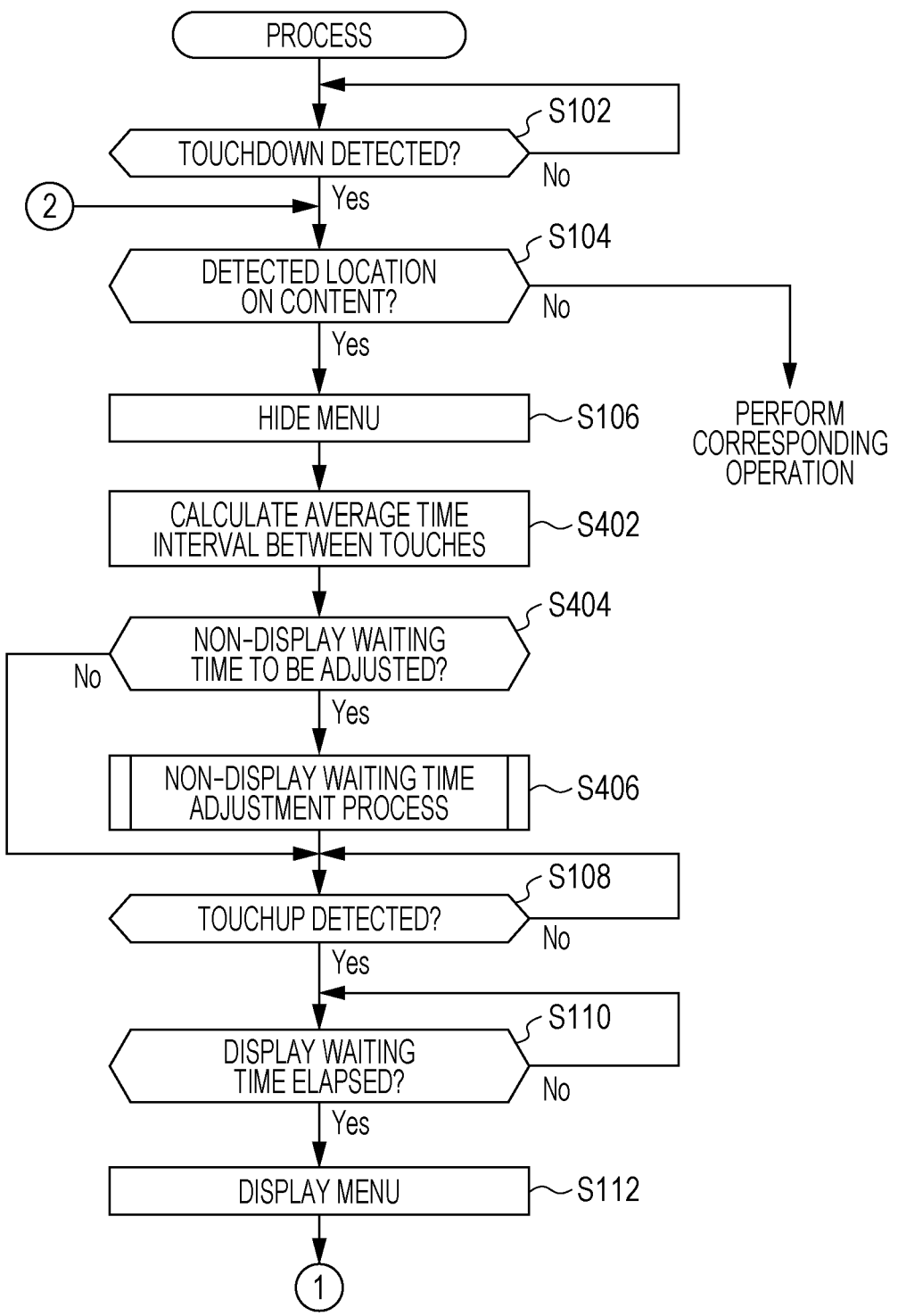
FIG. 10 is a flowchart illustrating a process of a fourth embodiment.

The process of the first embodiment of FIG. 4 is replaced with a process of FIG. 10. Operations identical to those of the first embodiments are designated with the same reference numerals and the discussion thereof is omitted herein.

In accordance with the fourth embodiment, a touch average time interval is calculated (step S402). The average time interval is an average time between one touchup and a next touchdown. The average time interval may be a time period between the same type of operations (one rendering operation and a next rendering operation) performed in series, or a time period different types of operations (one rendering operation and a movement operation next to it) performed in series. In other words, the time interval throughout which the menu is not used is measured. The time values thus measured are averaged as the average time interval.

The operations may be accepted only when the menu is displayed, or the operations performed within a time interval longer than a time limit (for example, 3 seconds) may not be accepted and operations performed within the time limit may be accepted. The touch time interval may be understood as a time period throughout which the menu is desirably hidden.

The controller 110 determines whether the non-display waiting time is to be adjusted by comparing the current non-display waiting time with the average touch time interval (step S404). A determination as to whether to adjust the non-display waiting time is made depending on how much the non-display waiting time is different from the average touch time interval.

For example, if the non-display waiting time is different from the average touch time interval by 0.5 second or more, or by 20 percent, the non-display waiting time is to be adjusted.

If the non-display waiting time is to be adjusted, a non-display waiting time adjustment process is performed (control proceeds from yes branch in step S404 to step S406). For example, the non-display waiting time may be set to be equal to the average touch time interval or a specific adjustment time may be added to or subtracted from the non-display waiting time. Alternatively, the non-display waiting time may set to be stepwise values, and an appropriate non-display waiting time may be selected depending on a difference from the average touch time interval.

In accordance with the fourth embodiment, the non-display waiting time may be adjusted (varied) depending on the operation timing of the user.

The average touch time interval may be set to be longer depending on the user. In such a case, the menu is displayed in a more restricted way so that flickering is efficiently controlled.

5. Fifth Embodiment

A fifth embodiment is described below. In the fifth embodiment, menus are switched and then displayed using the operation pen 15. The fifth embodiment is identical in functional configuration to the first embodiment, and the following discussion focuses on a difference therebetween.

Figure 11:
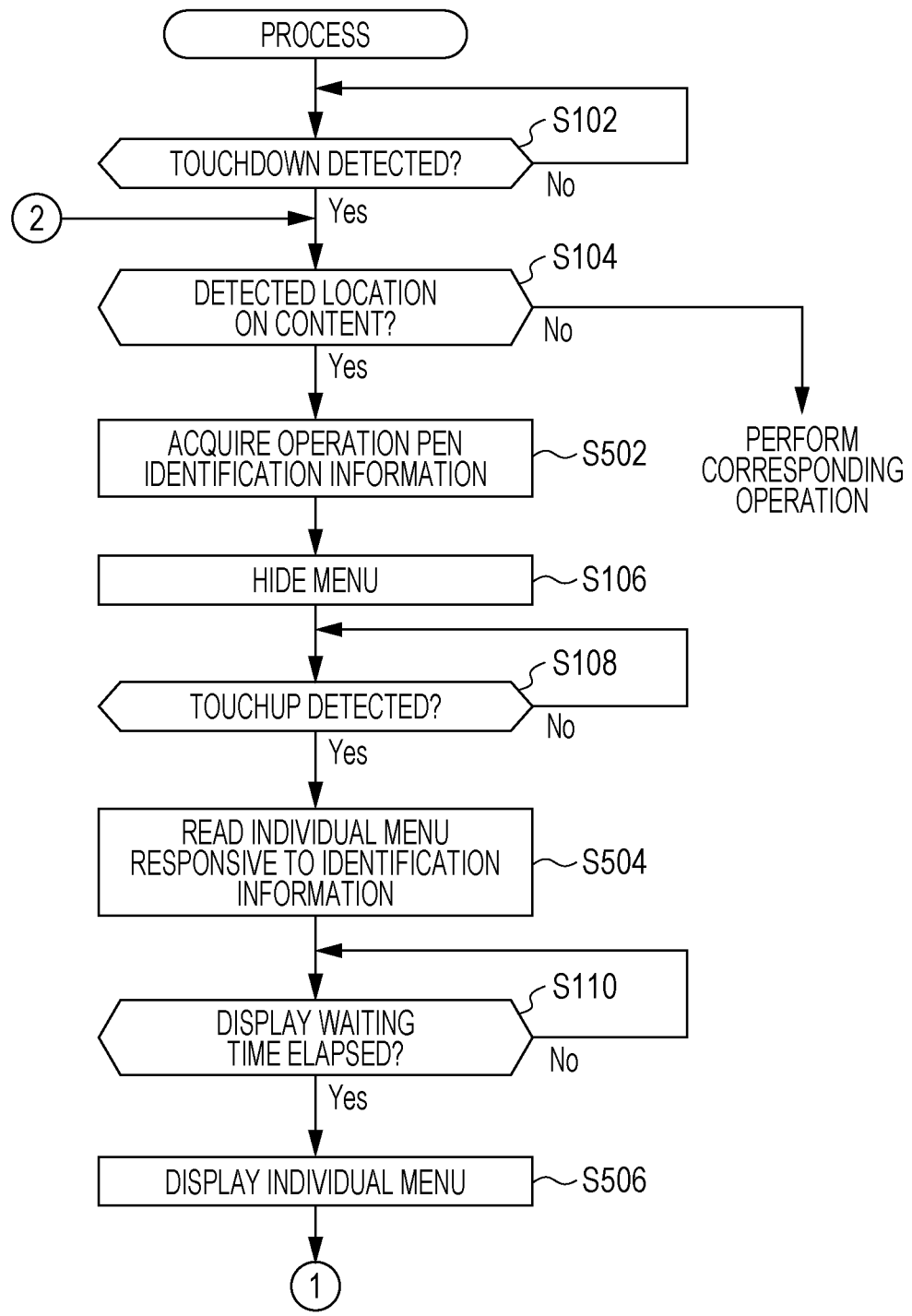
FIG. 11 is a flowchart illustrating a process of a fifth embodiment.

The process of the first embodiment of FIG. 4 is replaced with a process of FIG. 11. Operations identical to those of the first embodiments are designated with the same reference numerals and the discussion thereof is omitted herein.

In the fifth embodiment, individual menus are stored on the memory 140 in association with identification information of the operation pen 15. For example, menus different in operation are stored in association with a user A and a user B on the memory 140, for example.

In step S502, the identification information of the operation pen 15 is acquired (step S502). After a touchup is detected, the individual menu is read in accordance with the acquired identification information (step S504).

After the elapse of the display waiting time (yes branch from step S110), an individual menu is displayed (step S506).

In accordance with the sixth embodiment, individual menus are switched and displayed in response to the identification information of the operation pen 15. For example, if the user A is a teacher, and the user B is a student, a menu for the teacher and a menu for the student may be interchanged and displayed.

6. Sixth Embodiment

A sixth embodiment is described below. In the sixth embodiment, menus are switched and then displayed in response to the type of a touch operation. The sixth embodiment is identical in functional configuration to the first embodiment, and the following discussion focuses on a difference therebetween.

Figure 12:
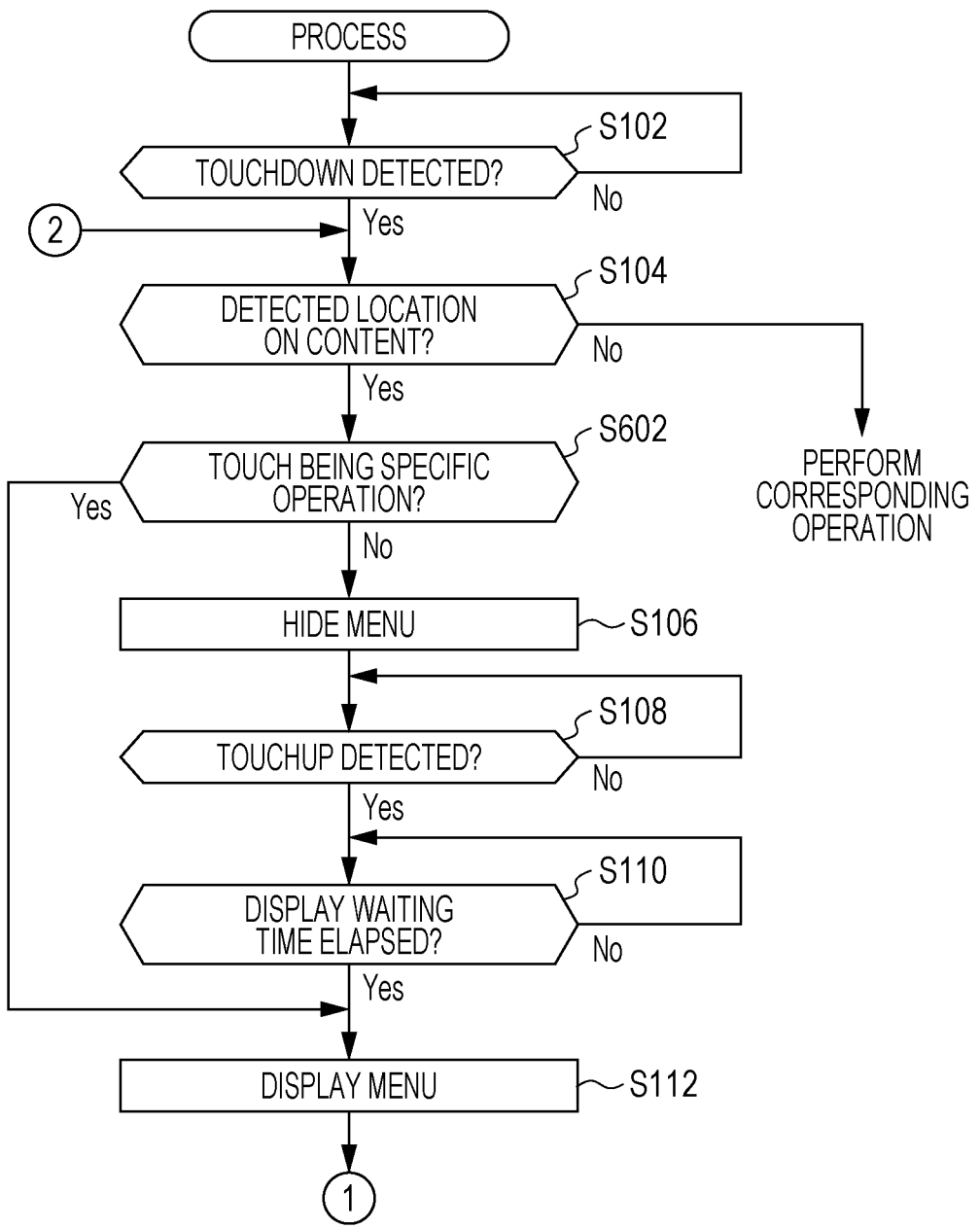
FIG. 12 is a flowchart illustrating a process of a sixth embodiment.

The process of the first embodiment of FIG. 4 is replaced with a process of FIG. 12. Operations identical to those of the first embodiments are designated with the same reference numerals and the discussion thereof is omitted herein.

In the sixth embodiment, a particular operation refers to an operation, other than a single touch operation, performed on the content. For example, the particular operation refers to a swipe operation for expansion or reduction, or a rotation operation. The particular operation may be an operation that the user has defined as the particular operation. For example, the particular operation may include a touch using three fingers.

When the touchdown is detected in response to a touch operation, the controller 110 determines whether the touch operation is a particular operation (step S602). If the touch operation is not a particular operation, the same process as in the first embodiment is performed. If the touch operation is a particular operation, operations in steps S106 through S110 are not performed. More specifically, menu displaying is performed (control proceeds to yes branch in step S602 to step S112).

In accordance with the sixth embodiment, the menu is displayed in the particular operation. For example, if the use of the menu has a higher priority in a operation other than the rendering operation, the particular operation is a useful operation.

It is noted that the particular operation allows the menu to be hidden. If the touch operation is determined to be a particular operation, control may proceed to step S160.

7. Seventh Embodiment

A seventh embodiment is described below. In accordance with the seventh embodiment, the user may set the menu to be hidden by performing a cancel operation. The seventh embodiment is identical in functional configuration to the first embodiment, and the following discussion focuses on a difference therebetween.

Figure 13:
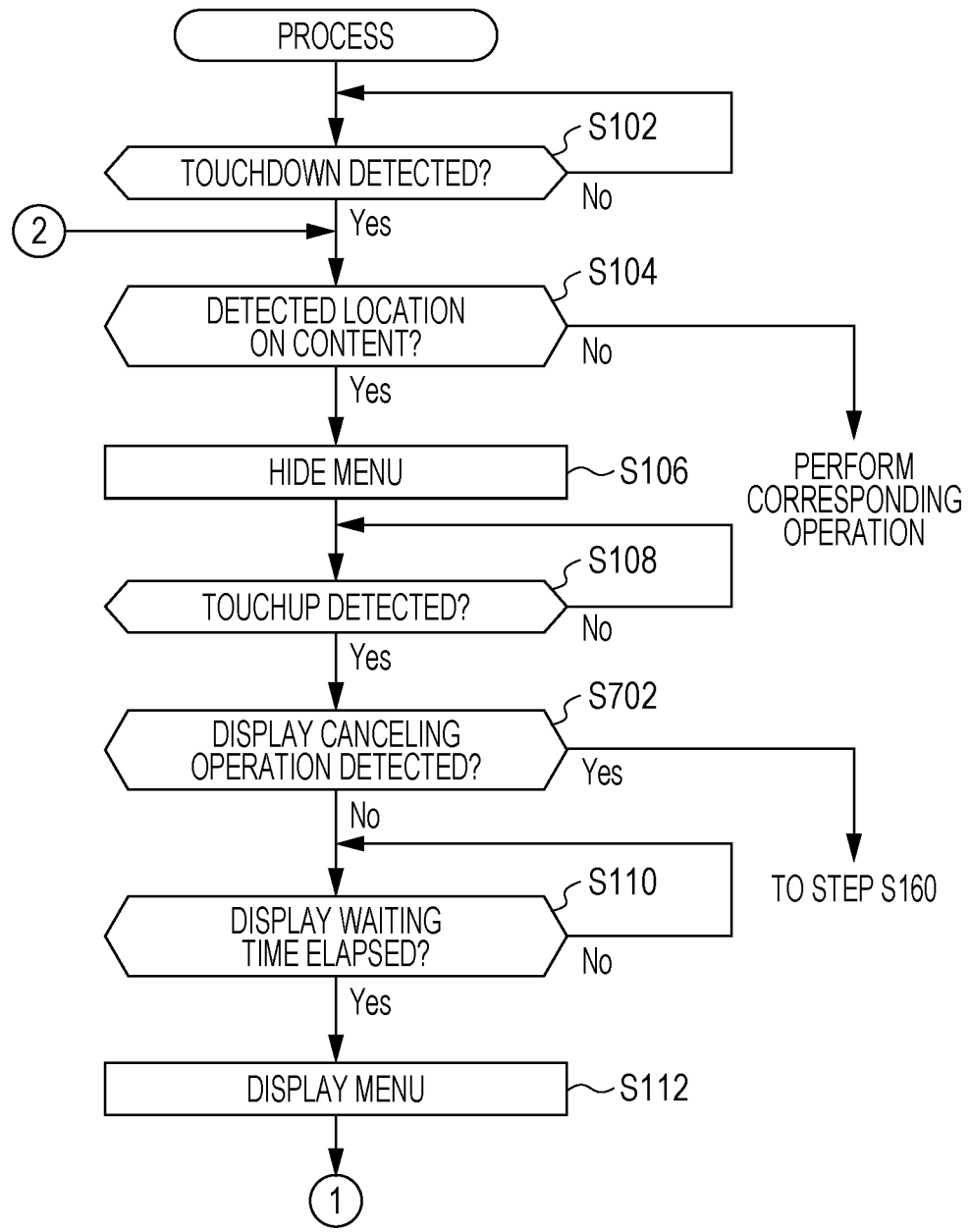
FIG. 13 is a flowchart illustrating a process of a seventh embodiment.

In the seventh embodiment, the process of the first embodiment of FIG. 4 is replaced with a process of FIG. 13.

Operations identical to those of the first embodiment are designated with the same reference numerals and the discussion thereof is omitted herein.

In accordance with the seventh embodiment, when a display cancel operation is detected (yes branch from step S702), control proceeds to step S160. More specifically, the content is displayed without the menu displayed on the content.

The controller 110 determines whether a predetermined cancel operation or a cancel operation configured by the user has been performed. The predetermined cancel operation or the cancel operation configured by the user may include an action that the user touches the touch panel with his or her finger in a state that the touch panel is touched with the operation pen 15, or an action that a touch operation is still performed in a state that a touch operation is made on the content.

When the cancel operation is performed, only the content is displayed without the menu displayed.

In accordance with the seventh embodiment, the operation menu is forcibly hidden in response to the user's intention.

8. Eighth Embodiment

An eighth embodiment is described below. In accordance with the eighth embodiment, the display waiting time or the non-display waiting time is modified in response to the content on which a touch operation is detected. The eighth embodiment is identical in functional configuration to the first embodiment, and the following discussion focuses on a difference therebetween.

In accordance with the eighth embodiment, the configuration table 142 is described in FIG. 14. More specifically, the display waiting time and the non-display waiting time are stored in association with the type of the content ("still image content").

In steps S102 and S104, the type of content at the detection location (currently serving as an operation target) is identified, and the display waiting time and the non-display waiting time are read. In step S110 and S158, control to display or hide the menu is performed by changing time on each piece of content.

In accordance with the eighth content, the display waiting time and the non-display waiting time are stored in association with the content. Additionally, the content may be stored in association with identification information of the operation pen and an operation (a slide operation or a rotation operation).

9. Ninth Embodiment

A ninth embodiment is described below. In accordance with the ninth embodiment, the menu is displayed first, and then the menu is changed in size in a stepwise fashion in accordance with the time elapse. The ninth embodiment is identical in functional configuration to the first configuration, and the following discussion focuses on a difference therebetween.

Figure 15:
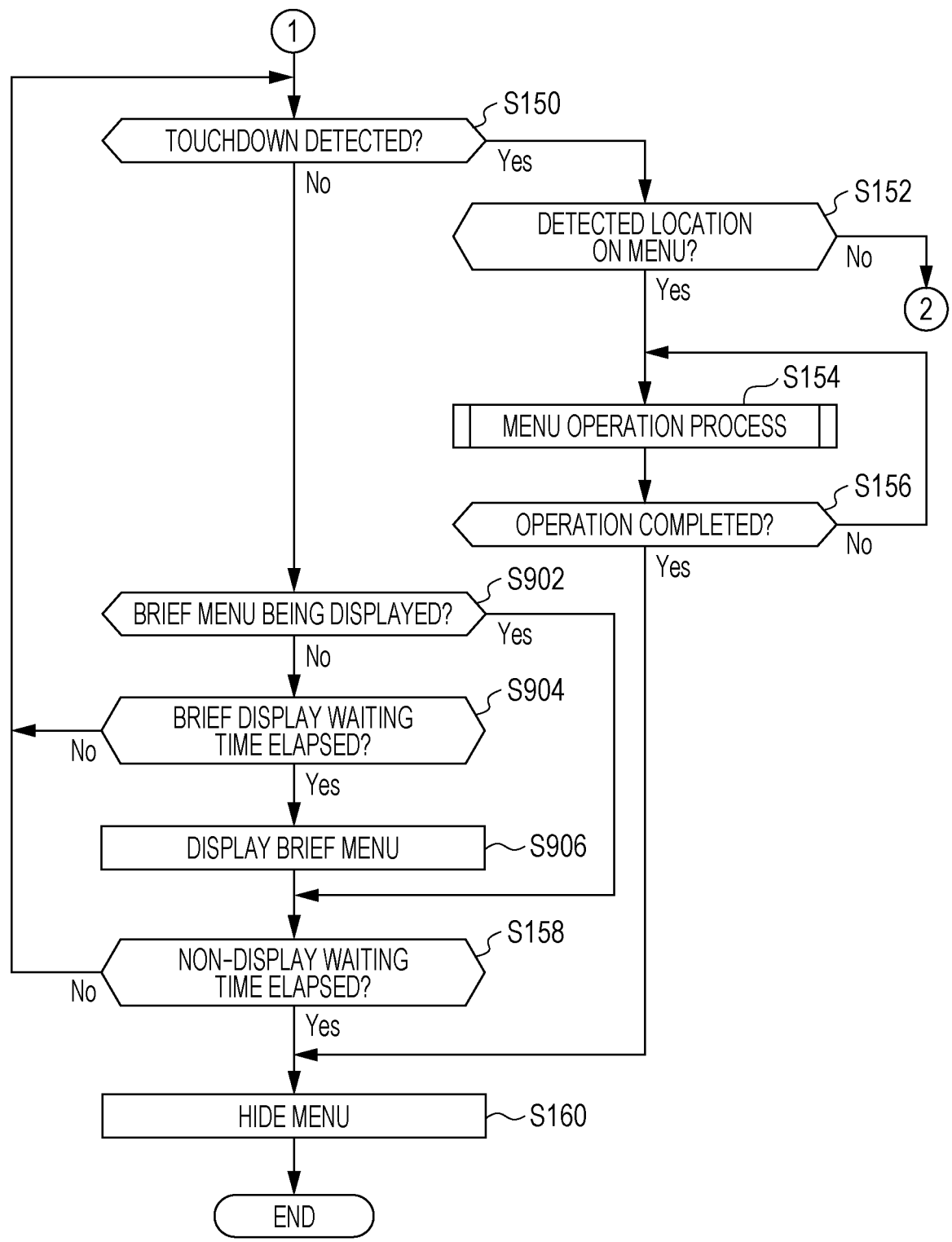
FIG. 15 is a flowchart illustrating a process of a ninth embodiment.

In the ninth embodiment, the process of the first embodiment of FIG. 5 is replaced with a process of FIG. 15. Operations identical to those of the first embodiment are designated with the same reference numerals, and the discussion thereof is omitted herein.

The menu is displayed on the content, and when a brief display waiting period has elapsed (yes branch in step S904), a brief menu different from the standard menu is displayed (step S906).

When the non-display waiting time is displayed with the brief menu displayed (control proceeds from yes branch in step S902 to yes branch in step S158), the menu is hidden (step S160). The controller 110 determines in step S902 whether the brief menu is being displayed or not. This is because operations in steps S904 and S906 are not performed if the brief menu is displayed.

Figure 16:
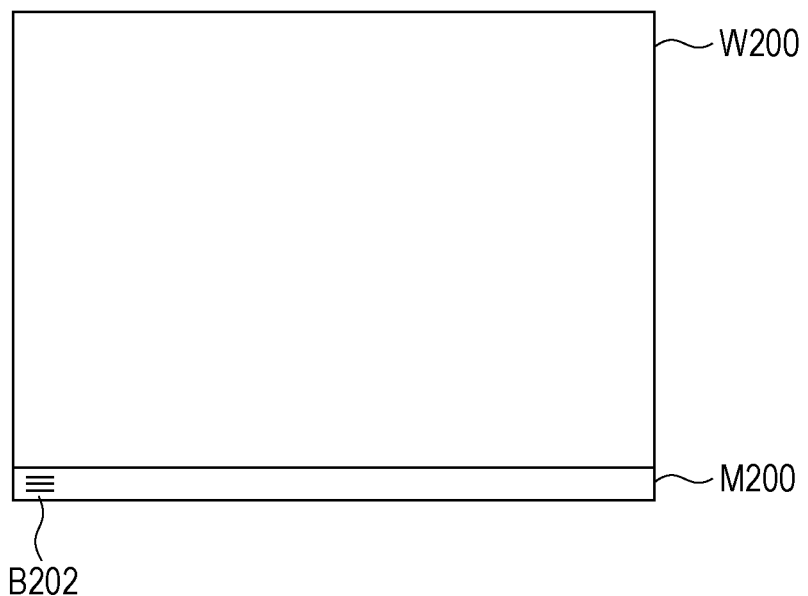
FIG. 16 illustrates an operation of the ninth embodiment (to display content).

FIG. 16 illustrates an example of the brief menu. Referring to FIG. 16, a menu M200 is displayed on content W200. The menu M200 is smaller than the menu M100 of FIG. 6A. Operation buttons displayed are only a menu button B202. When the menu button B202 is selected, the menu may be called, or the menu M100 of FIG. 6A may be displayed.

The brief menu may be switchably displayed using an icon or in a see-through fashion. In accordance with the ninth embodiment, the menu is displayed after the touchup. When the menu is hidden, the display of the menu may be changed in a stepwise fashion.

10. Modifications

The embodiments have been described with reference to the drawings. Configurations are not limited to those described above. The disclosure covers any design as long as the design falls within the scope of the disclosure.

In accordance with the embodiments, the operation detection unit is a touch panel (tap operation). Alternatively, an external input device, such as a mouse, may be used to perform a click operation as a touch operation.

In accordance with the embodiments, the display 130 and the operation detecting unit 120 are integrated into a unitary body as the touch panel. Another mechanism may be employed to embody the disclosure. For example, a projector may be used as the display 130 and a human sensor may be used as the operation detecting unit 120. A display system may be implemented by connecting a computer to the operation detecting unit 120 and the display 130.

In accordance with the embodiments, the menu is displayed on the content. Alternatively, the menu may be displayed in a balloon.

In accordance with the embodiments, the menu is not hidden when it is not used. The display apparatus is thus used in a user friendly fashion.

The embodiments are described separately for convenience of explanation. It is understood that the embodiments are combined in a technically viable fashion. For example, the operation described with reference to the fourth embodiment may be combined and used with another embodiment. More specifically, by combining the fourth embodiment and the second embodiment, the non-display waiting time is adjusted in response to a difference in the touch operation between the operation pen and the finger.

The embodiments of the disclosure may be combined in a consistent way.

The program running on each apparatus of the embodiments controls a CPU to implement the functionalities of the embodiments (program causing a computer to function). Information handled by the apparatus is temporarily stored on a storage device (such as a RAM) during each process. The program is then stored on a storage device, such as a variety of ROMs, HDD, or SSD. As appropriate, the CPU reads, writes, and corrects the program.

To circulate the program in the market, the program may be stored on a portable recording medium, or may be transferred to a server computer via a network, such as the Internet. In such a case, a storage device in the server computer may fall within the scope of the disclosure.

The present disclosure contains subject matter related to that disclosed in Japanese Priority Patent Application JP 2017-015661 filed in the Japan Patent Office on Jan. 31, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An apparatus for displaying content on a touch panel comprising:
   the touch panel that detects a touchdown to touch the touch panel and a touchup to lift off from the touch panel to cancel touching;
   a controller that performs control to display a menu if the touchup is detected after the touchdown is detected within a display region of the content; and
   a communication unit that communicates with an operation pen, wherein
   the controller determines that an object having touched the touch panel is the operation pen if the communication unit is communicable with the operation pen and determines that the object having touched the touch panel is an object other than the operation pen if the communication unit is not communicable with the operation pen,
   the controller performs control to display the menu after a time elapse of a first waiting time period since the detection of the touchup if the touch operation has been performed with the operation pen,
   the controller performs control to display the menu without waiting for the time elapse of the first waiting time period if the touch operation has been performed with the object other than the operation pen, and
   the controller switches the first waiting time based on a type of the content.

2. The apparatus according to claim 1, wherein the controller performs control to switch a display mode of the displayed menu after a time elapse of a second waiting time period from the displaying of the menu.

3. The apparatus according to claim 2, wherein the controller performs control to switch the menu display mode to a mode to hide the menu after the time elapse of the second waiting time period.

4. The apparatus according to claim 3, wherein:
   a thumbtacked state of the menu is able to be switched, and
   the controller keeps the menu displayed after the time elapse of the second waiting time period if the thumbtacked state is on.

5. The apparatus according to claim 2, wherein:
   the controller calculates as a touch interval average time an average time from when the touchdown is detected to when the touchup is detected; and
   the controller adjusts the second waiting time period by comparing the second waiting time period with the touch interval average time.

6. The apparatus according to claim 1, wherein the controller performs control by switching a display mode of the displayed menu if the touchdown is detected on the content with the menu displayed.

7. The apparatus according to claim 1, wherein the controller performs control to display the menu overlaid on the content.

8. The apparatus according to claim 1, wherein:
   the controller determines an identification information of the operation pen, and
   the controller performs control to display an individual menu based on the identification information of the operation pen.

9. The apparatus according to claim 1, wherein the controller sets the menu to be hidden if a touch operation by the object other than the touch pen is detected while the touch operation by the operation pen is detected.

10. A method for displaying content on a touch panel, comprising:
    detecting a touchdown to touch the touch panel and a touchup to lift off from the touch panel to cancel touching;
    performing control to display a menu if the touchup is detected after the touchdown is detected within a display region of the content;
    communicating with an operation pen;
    determining that an object having touched the touch panel is the operation pen if the touch panel is communicable with the object in contact with the touch panel, and determining that the object having touched the touch panel is an object other than the operation pen if the touch panel is not communicable with the object in contact with the touch panel, wherein
    the menu is displayed after a time elapse of a first waiting time period since the detection of the touchup if the touch operation has been performed with the operation pen,
    the menu is displayed without waiting for the time elapse of the first waiting time period if the touch operation has been performed with the object other than the operation pen, and
    the first waiting time is switched based on a type of the content.

11. A non-transitory computer-readable recording medium that stores thereon a computer program causing a computer to execute a process for displaying content on a touch panel, the process comprising:
    detecting a touchdown to touch the touch panel and a touchup to lift off from the touch panel to cancel touching;
    performing control to display a menu if the touchup is detected after the touchdown is detected within a display region of the content;
    communicating with an operation pen;
    determining that an object having touched the touch panel is the operation pen if the touch panel is communicable with the object in contact with the touch panel, and determining that the object having touched the touch panel is an object other than the operation pen if the touch panel is not communicable with the object in contact with the touch panel, wherein
    the menu is displayed after a time elapse of a first waiting time period since the detection of the touchup if the touch operation has been performed with the operation pen,
    the menu is displayed without waiting for the time elapse of the first waiting time period if the touch operation has been performed with the object other than the operation pen, and
    the first waiting time is switched based on a type of the content.

* * * * *